(12) United States Patent
Afting

(10) Patent No.: US 8,764,042 B2
(45) Date of Patent: Jul. 1, 2014

(54) PULL-TYPE AGRICULTURAL IMPLEMENT DRAWBAR HITCH CONNECTOR

(71) Applicant: Maschinenfabrik Bernard Krone GmbH, Spelle (DE)

(72) Inventor: Andreas Afting, Emsbüren (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 6 days.

(21) Appl. No.: 13/691,765

(22) Filed: Dec. 1, 2012

(65) Prior Publication Data

US 2014/0150392 A1    Jun. 5, 2014

(51) Int. Cl.
*B60D 1/36* (2006.01)

(52) U.S. Cl.
USPC ............ 280/477; 280/479.3; 280/455.1; 172/249

(58) Field of Classification Search
USPC ........... 280/477, 479.3, 455.1, 506, 492, 493, 280/504, 509, 508; 172/249, 248, 250; 56/15.7, 14.9
See application file for complete search history.

(56) References Cited

U.S. PATENT DOCUMENTS

| | | | |
|---|---|---|---|
| 2,048,310 A * | 7/1936 | Wohldorf | 280/477 |
| 4,666,177 A * | 5/1987 | Vinchattle | 280/477 |
| 4,893,829 A * | 1/1990 | Davis | 280/479.2 |
| 4,991,865 A * | 2/1991 | Francisco | 280/477 |
| 5,009,446 A * | 4/1991 | Davis | 280/479.2 |
| 5,503,422 A * | 4/1996 | Austin | 280/477 |
| 5,706,901 A * | 1/1998 | Walters et al. | 172/439 |
| 6,102,422 A * | 8/2000 | Damron | 280/477 |
| 6,412,570 B1 * | 7/2002 | Pruitt et al. | 172/449 |
| 6,796,573 B2 * | 9/2004 | Beaudoin | 280/477 |
| 6,851,696 B1 * | 2/2005 | Hensley | 280/455.1 |
| 6,877,758 B2 * | 4/2005 | Colistro | 280/494 |
| 7,004,488 B2 * | 2/2006 | Reiter et al. | 280/477 |
| 7,364,180 B2 * | 4/2008 | Hensley | 280/455.1 |
| 2012/0151892 A1 | 6/2012 | Clark et al. | |

* cited by examiner

*Primary Examiner* — Árpád Fábián-Kovács
(74) *Attorney, Agent, or Firm* — Gudrun E. Huckett

(57) ABSTRACT

A pull-type agricultural implement has a beam with drawbar hitch pivotable relative to the beam about a vertical axis and a horizontal axis extending in the travel direction. The drawbar hitch has a receptacle for a tractor drawbar. The receptacle enables pivoting of the drawbar about an axis that is horizontal and transverse to the travel direction relative to the drawbar hitch in a locked position. Guiding and adjusting plates in the receptacle allow adjustment of the receiving width of the receptacle to different drawbar dimensions. From a first position, in which the plates limit lateral play of a drawbar with large cross-section relative to the travel and working direction to a minimum, the guiding and adjusting plates are transferrable and lockable in a second position, in which the plates limit lateral play of a drawbar with small cross-section relative to the travel direction to a minimum.

23 Claims, 5 Drawing Sheets

PULL-TYPE AGRICULTURAL IMPLEMENT DRAWBAR HITCH CONNECTOR

BACKGROUND OF THE INVENTION

The invention relates to a pull-type agricultural implement comprising a frame that is supported by means of wheels on the ground wherein on the frame at least one working unit for working an agricultural field or meadow is arranged. Such an implement is connected by means of a beam, connected to the frame, to a drawbar of an agricultural combined tractor and drive machine such as a tractor or the like. At the end of the beam that is facing the agricultural combined tractor and drive machine, a drawbar hitch is provided that is connected to the beam so as to be pivotable about at least one vertical axis and an axis that is approximately horizontal and extends in the travel and working direction. The drawbar hitch at its end that is facing the agricultural combined tractor and drive machine has a channel-type receptacle for releasably locking the drawbar of the agricultural combined tractor and drive machine. The receptacle enables a pivot movement of the drawbar about an axis that is approximately horizontal and transverse to the travel and working direction relative to the drawbar hitch in the locked state.

Such implements are known in various embodiments. The drawbars of the tractors are referred to conventionally as hitch connector and in practice many different cross-sectional sizes are employed on tractors. Interchanging pull-type agricultural implements on different tractors therefore requires always complex adjustment labor before an implement is safely hitched on the tractor for safe operation.

U.S. 2012/0151892 A1 discloses a pull-type agricultural implement in the form of a mowing implement that is pulled by a tractor. By means of a drawbar hitch connected to the front end of a beam of the pull-type mowing machine, the mowing implement can be hitched to and locked on a drawbar of a rectangular cross-section in that the drawbar is inserted into a receptacle of the drawbar hitch and locked by a bolt. For compensating the lateral play between the drawbar and the drawbar hitch, it is required beforehand to determine the precise dimensions of the shaft-type drawbar and, in accordance with the determined dimensions, to attach a required number of lateral adjusting plates or to provide a lateral adjusting plate with a required material thickness at each sidewall of the receptacle so that the drawbar is then received in the receptacle of the drawbar hitch with a defined minimal play for an operationally safe transport of the pull-type implement on the field or on the road. A disadvantage of this configuration is the significant expenditure for carrying out the hitching action.

SUMMARY OF INVENTION

The present invention has therefore the object to propose a pull-type agricultural implement with a drawbar hitch in which the disadvantages of the prior art are avoided and the hitching action of the implement on a drawbar of an agricultural combined tractor and drive machine in the form of a tractor or the like can be performed with an expenditure as minimal as possible.

According to the invention, this object is solved in that an approximately channel-type receptacle of the drawbar hitch for adjustment to different dimensions of the respective drawbar has associated therewith guiding and adjusting plates that, within the channel-type receptacle, from a position, in which the guiding and adjusting plates limit a lateral play of a drawbar with large cross-sectional dimensions relative to the travel and working direction to a minimum, are transferrable and lockable in a position, in which the guiding and adjusting plates limit a lateral play of a drawbar with small cross-sectional dimensions relative to the travel and working direction to a minimum.

This is further solved in that the channel-type receptacle of the drawbar hitch for adjustment to different dimensions of the respective drawbar has correlated therewith guiding and adjusting plates which, within the channel-type receptacle, from a position, in which the guiding and adjusting plates limit the lateral play of a drawbar with large cross-sectional dimensions relative to the travel and working direction to an adjusted size, are transferrable and lockable in a position, in which the guiding and adjusting plates limit the lateral play of a drawbar with small cross-sectional dimensions relative to the travel and working direction to an adjusted size.

Further advantageous embodiments are disclosed in the dependent claims.

Accordingly, a pull-type agricultural implement with a frame that is supported by wheels on the ground is provided wherein on the frame at least one working unit for working an agricultural field or meadow is arranged. The frame is connectable by means of a beam with a drawbar of an agricultural combined tractor and drive machine wherein at the end of the beam that is facing the agricultural combined tractor and drive machine a drawbar hitch is provided that is connected to the beam so as to be pivotable about at least one vertical axis and an axis that is approximately horizontal and extends in travel and working direction. The drawbar hitch has at its end that is facing the agricultural combined tractor and drive machine a channel-type receptacle for releasably locking the drawbar of the agricultural combined tractor and drive machine. The receptacle permits a pivot movement of the drawbar about an axis that is approximately horizontal and transverse to the travel and working direction relative to the drawbar hitch in the locked state. For adjustment of the channel-type receptacle of the drawbar hitch to different dimensions of the respective drawbar, the channel-type receptacle has associated therewith guiding and adjusting plates. From a position, in which the guiding and adjusting plates limit a lateral play of a drawbar with large cross-sectional dimensions relative to the travel and working direction to a minimum, these guiding and adjusting plates within the channel-type receptacle are transferrable into, and then lockable in, a position, in which the guiding and adjusting plates limit a lateral play of a drawbar with small cross-sectional dimensions relative to the travel and working direction to a minimum.

According to the invention, it is now possible during the hitching process to insert the drawbar of the agricultural combined tractor and drive machine into the receptacle of the drawbar hitch wherein the guiding and adjusting plates associated with the receptacle initially release an insertion space of maximum width for the drawbar. Once the drawbar has been completely inserted into the receptacle and locking by inserting a bolt into the aligned bores of the drawbar and the drawbar hitch has been done, the lateral play of the drawbar in the receptacle can be limited to a minimum by a feeding movement of the guiding and adjusting plates in a direction toward the drawbar.

A minimal play between the drawbar and the guiding and adjusting plates of the receptacle prevents that the drawbar is clamped between the guiding and adjusting plates. Accordingly, with the minimal play between the drawbar and the guiding and adjusting plates it is ensured that a pivotable compensation between the drawbar and the drawbar hitch about a horizontal axis that is transverse to the travel and working direction is possible at anytime. This compensation is necessary when the unit of agricultural combined tractor and drive machine and the implement travels across a hill, for example, or is passing through a ground depression.

The feeding movement of the guiding and adjusting plates in the direction of the drawbar inserted into the receptacle can be realized in various ways. In a first embodiment, the guiding and adjusting plates can be guided such that the feeding action is approximately parallel to the drawbar. A further advantageous embodiment can also be designed such that the guiding and adjusting plates are pivotably fed toward the lateral surfaces of the drawbar. This requires that the guiding and adjusting plates in the receptacle are pivotably supported by an approximately vertically oriented bearing bolt. According to a further advantageous embodiment of the invention, the feeding action of the guiding and adjusting plates in the direction of the drawbar can be realized in steps with a uniform step interval. An operator-friendly design is based on the guiding and adjusting plates having associated therewith perforated plates which are disposed between locking plates that are mounted on the drawbar hitch. The locking plates as well as the perforated plates comprise a hole pattern of locking bores wherein both hole patterns are matched to each other such that across the entire adjusting range numerous adjusting possibilities are achievable. An effective adaptation of the width of the receptacle for the drawbar is thus made available. Moreover, with the afore described embodiment it is prevented that the drawbar can be clamped between the guiding and adjusting plates.

Moreover, the invention may also provide a continuous feeding action of the guiding and adjusting plates in the direction of the drawbar. For this purpose, for example, threaded spindles or similar components can be used for adjusting the lateral play between the guiding and adjusting plates and the drawbar. However, in this embodiment, precautionary measures must be provided by means of which clamping of the drawbar can be prevented reliably.

In a further advantageous embodiment of the invention, it can be provided that the feeding action of the guiding and adjusting plates is done synchronously from both sides of the receiving pocket of the drawbar hitch. In this way, it is ensured that the drawbar is always centrally guided relative to the receptacle of the drawbar hitch.

Moreover, it can be provided according to the invention that for adaptation to different drawbars, the drawbar hitch has bushings associated therewith. The bushings have the purpose of matching the respective size of the bore in the drawbar to the bolts so that locking of the drawbar in the receptacle of the drawbar hitch with only minimal play can be achieved.

An inexpensive further embodiment of the invention resides in that the articulated connection between the drawbar hitch and the beam of the pull-type agricultural implement has only a vertically oriented pivot axis. By means of this configuration, the required play between the guiding and adjusting plates and the drawbar can be adjusted to an adjusted size. The required play with adjusted size then enables a certain pivoting action of the drawbar hitch relative to the drawbar which is concentrated on an approximately horizontal axis that is oriented in the travel and working direction.

DESCRIPTION OF THE PREFERRED EMBODIMENTS

Figure 1:
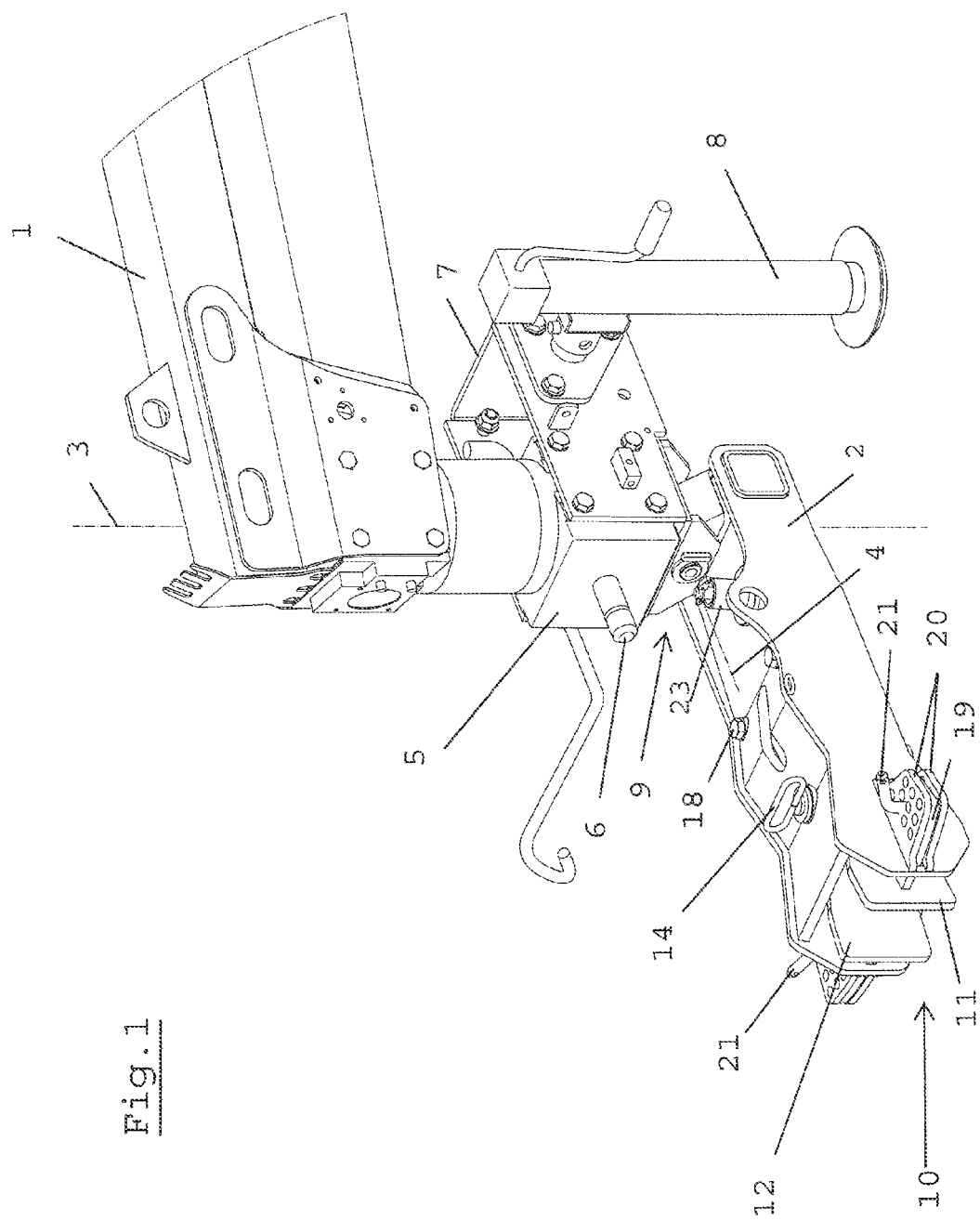
FIG. 1 is a perspective illustration of a front end of a beam with drawbar hitch of a pull-type agricultural implement.
Figure 4:
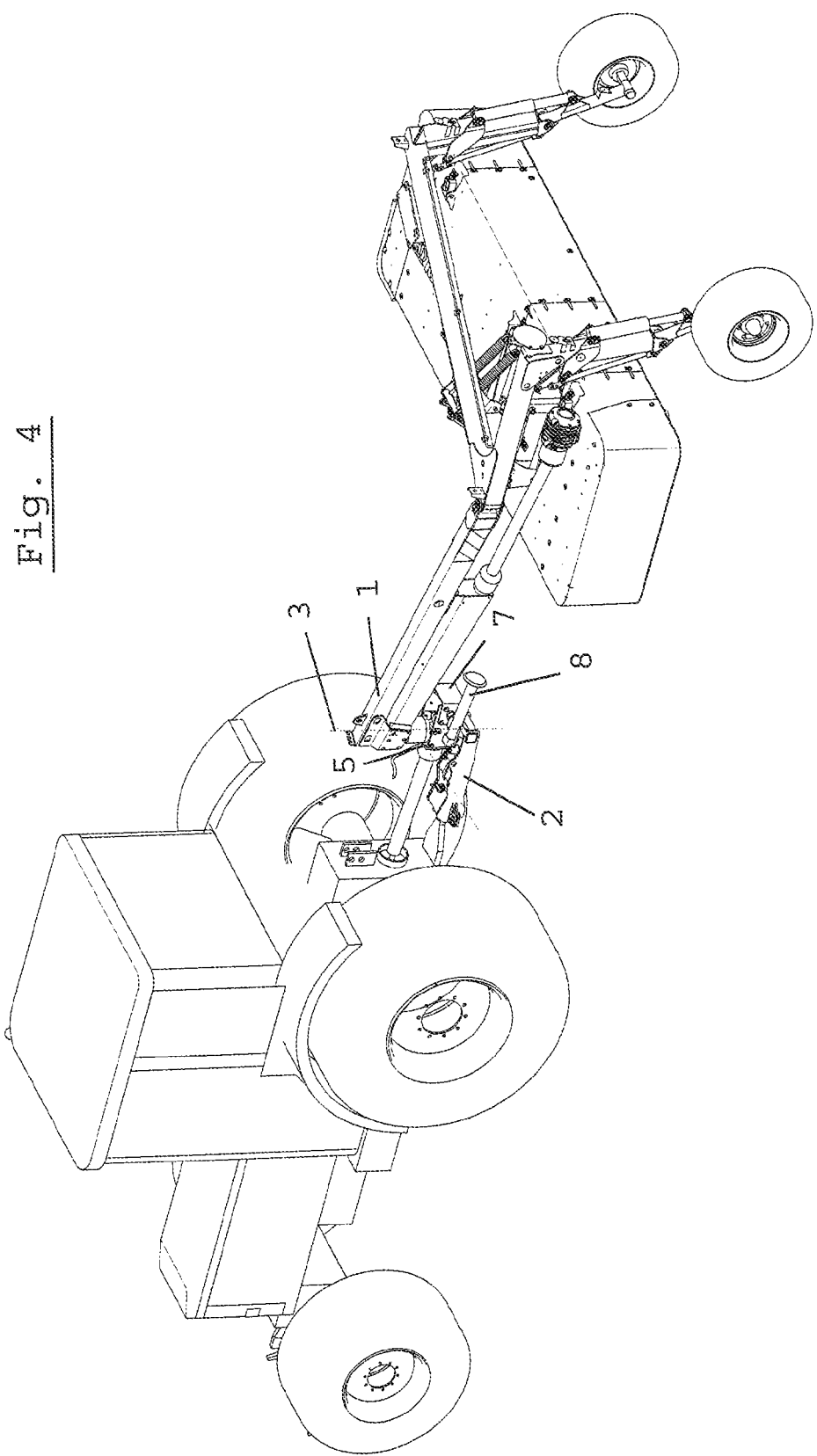
FIG. 4 shows in a perspective schematic view a tractor as an example of an agricultural combined tractor and drive machine with a pull-type agricultural implement attached by the drawbar hitch to the tractor.

FIG. 1 shows a beam 1 of a pull-type agricultural implement for working an agricultural field or meadow. According to the invention, the term "working" is to be understood as any type of action that encompasses actions beginning with working of the soil to harvesting of the crops. For example, the pull-type agricultural implement can comprise a working unit connected to the frame that is supported by wheels on the ground, wherein the working unit is in the form of a mowing device for harvesting stalk crops. During processing of an agricultural field or meadow the pull-type agricultural implement is pulled by an agricultural combined tractor and drive machine, for example in the form of a tractor, across the field or meadow and can be driven or operated by means of a conventional articulated (universal) shaft. FIG. 4 shows schematically a tractor/implement arrangement connected by a drawbar hitch.

At the front end of the beam 1, i.e., the end of the beam 1 that is facing the agricultural combined tractor and working machine, the beam 1 has a drawbar hitch 2 that is connected to the beam 1 so as to be pivotable about vertical axis 3 and an axis 4 that is approximately horizontal and oriented in the travel and working direction F. The connecting area forms a pivoting gearbox 5 which has a top and a bottom section wherein the bottom section of the pivoting gearbox 5 is connected to the top section so as to be pivotable about the vertical axis 3. At a connector 6 for the articulated shaft, the working unit of the pull-type agricultural implement can be supplied by a conventional articulated shaft with drive energy. Furthermore, at the bottom section of the pivoting gearbox 5 a holder 7 is screwed on that serves as receiving means for a support leg 8. In the leading area the holder 7 comprises an articulated joint 9 that enables a pivot movement of the drawbar hitch 2 relative to the beam 1 about the axis 4 that is horizontal and extends in the travel and working direction F.

At the receiving end of the drawbar hitch 2 that is opposite the connecting location of the drawbar hitch 2 on the holder 7, the drawbar hitch 2 has a channel-like receptacle 10 within which the guiding and adjusting plates 11, 12 are disposed that provide a limitation, in a horizontal direction and transverse to the travel and working direction F, of the receiving width of the receptacle of the drawbar hitch 2. For performing the hitching process of the pull-type agricultural implement to an agricultural combined tractor and drive machine, a drawbar 13 of the agricultural combined tractor and drive machine can be inserted into the receptacle 10 of the drawbar hitch 2 and can be locked by a bolt 14 that extends through aligned bores of the drawbar hitch 2 and the drawbar 13.

Figure 2:
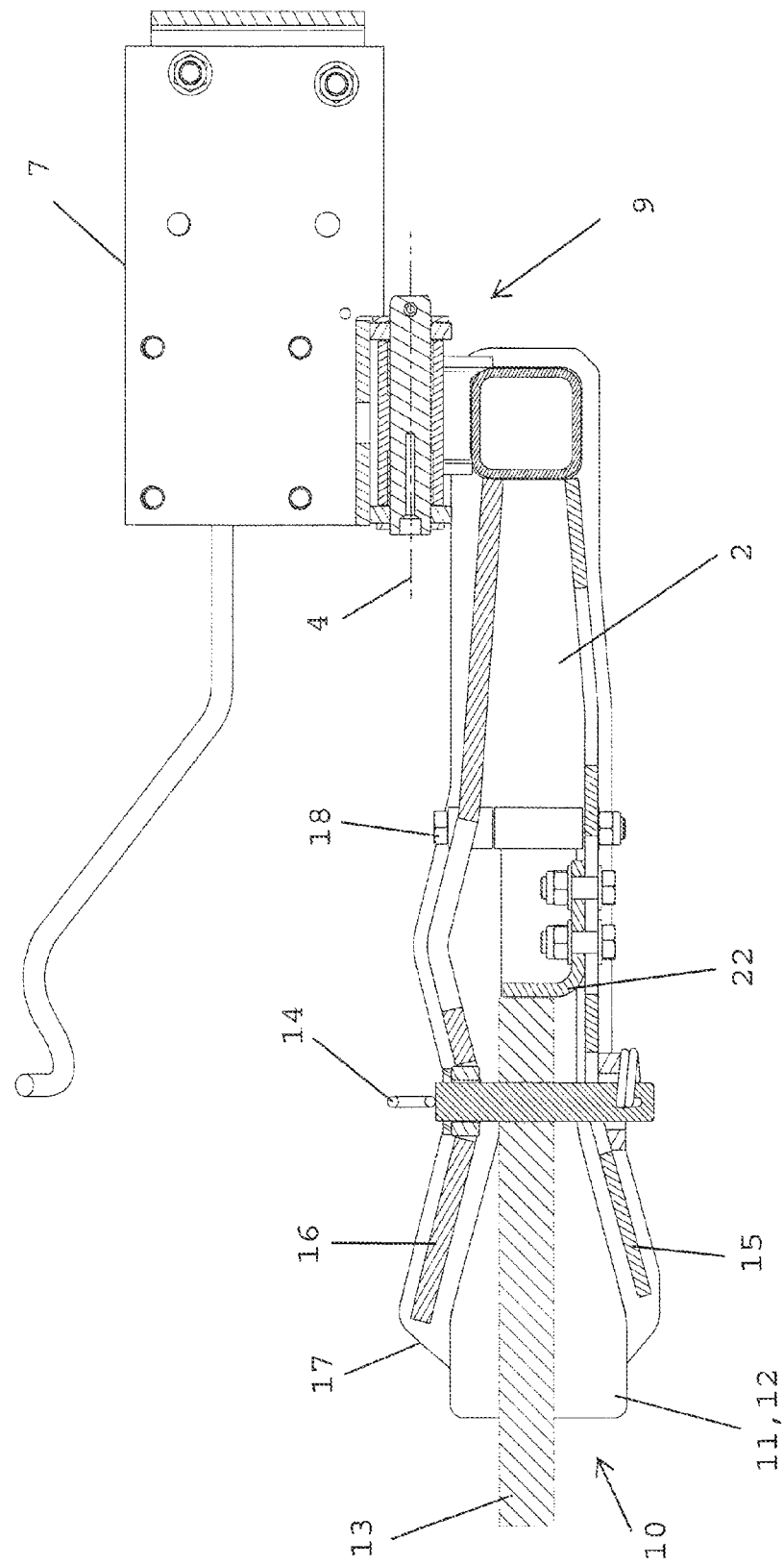
FIG. 2 is a section illustration of the drawbar hitch according to FIG. 1 along a section plane that is taken in a vertical longitudinal center plane of the drawbar hitch that extends in the travel and working direction.
Figure 3:
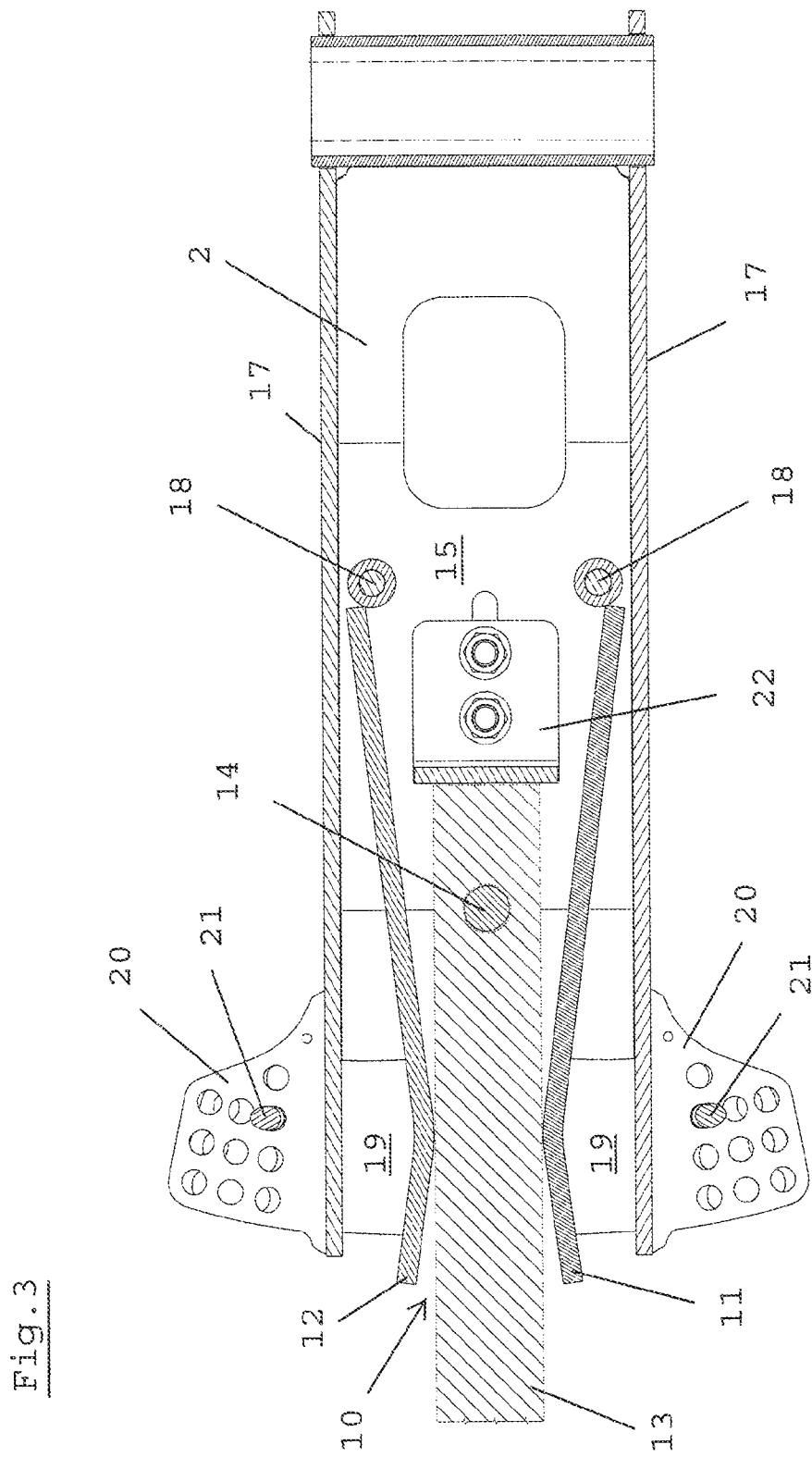
FIG. 3 is a section illustration of the drawbar hitch according to FIG. 1 along a section plane that is taken in a horizontal longitudinal center plane of the drawbar hitch that extends in the travel and working direction.

The section illustrations according to FIG. 2 and FIG. 3 show in more detail the configuration of the components within the receptacle 10 of the drawbar hitch 2 in an advantageous embodiment. The drawbar hitch 2 which is embodied as a box-shaped structure is comprised of a bottom plate 15 and a cover plate 16 wherein the bottom plate 15 and the cover plate 16 are connected to each other by side plates 17. For simplifying the insertion of the drawbar 13 into the receptacle 10, the leading areas of the bottom plate 15 and of the cover plate 16 are positioned at a slant downwardly and at a slant upwardly, respectively. Within this box-shaped structure the guiding and adjusting plates 11, 12 are pivotably supported by bearing bolts 18 and can therefore be moved from a first position, in which they are resting against the side plates 17 and can thus receive a drawbar with large cross-sectional dimensions, into a second position in which the guiding and adjusting plates 11, 12, by a pivot movement about the bearing bolts 18, contact the lateral contact surfaces of a drawbar 13 with small cross-sectional dimensions.

For locking the guiding and adjusting plates 11, 12, they have perforated plates 19 that are guided between locking plates 20 connected to the side plates 17. For securing the pivot position of the guiding and adjusting plates 11, 12, the locking plates 20 have a hole pattern that is matched to the hole pattern of the perforated plates 19. The hole patterns of the perforated plates 19 and of the locking plates 20 are designed such that only one of the two hole patterns can be aligned and can be used for locking the guiding and adjusting plates 11, 12 by means of the hitch bolt 21. With this stepped adjustment and locking action of the guiding and adjusting plates 11, 12, it is ensured that clamping (i.e., elimination of play) of the drawbar 13 between the guiding and adjusting plates 11, 12 cannot occur because the hitch bolt 21 can be inserted into an aligned bore of the hole patterns of the perforated plates 19 and of the locking plates 20 only when a minimal play between the guiding and adjusting plates 11, 12 and the drawbar 13 is still existing.

As can be moreover seen in particular in FIG. 3, the guiding and adjusting plates 11, 12 have a somewhat angled shaped in the leading area. This angled shape of the guiding and adjusting plates 11, 12 assists, on the one hand, the insertion process of the drawbar 13 into the receptacle 10 and, on the other hand, it is ensured in this way that for the sizes of the cross-sections of the drawbars 13 that are encountered in practice there will be always a geometrically optimal contact of the guiding and adjusting plates 11, 12 of the lateral contact surfaces of the drawbar 13.

FIGS. 2 and 3 also show that the drawbar hitch 2 for limiting the insertion depth of a drawbar 13 into the receptacle 10 has correlated therewith a stop element 22. For adaptation to different lengths of the respective drawbar 13, the stop element 22 is adjustable continuously, i.e., its screwed-on position on the bottom plate 15 of the drawbar hitch 2 is adjustable continuously.

In an advantageous further embodiment, it can be provided according to the invention that for adaptation to different drawbars 13 the drawbar hitch 2 has bushings 23 (FIG. 1) correlated therewith which serve for adjusting the respective size of the bores in the drawbar 13 to the bolt 14 so that a locking action of the drawbar 13 in the receptacle 10 of the drawbar hitch 2 can be achieved with only minimal play.

Figure 5:
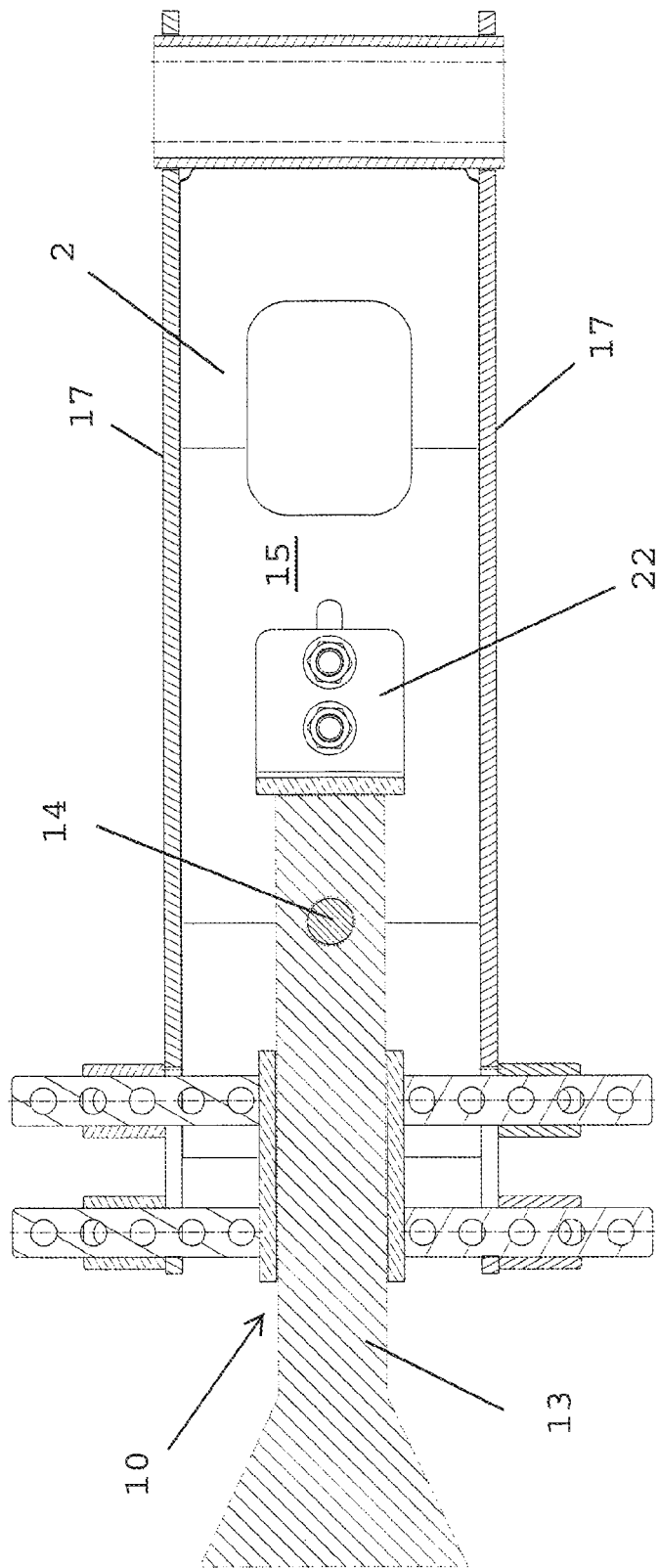
FIG. 5 shows parallel adjustment of the guiding and adjusting plates.

FIG. 5 shows an alternative embodiment where the guiding and adjusting plates are advanced toward the drawbar 13 in parallel orientation to the drawbar 13. The same type of securing action with perforated plates disposed between locking plates mounted on the drawbar hitch is provided.

While specific embodiments of the invention have been shown and described in detail to illustrate the inventive principles, it will be understood that the invention may be embodied otherwise without departing from such principles.

What is claimed is:

1. A pull-type agricultural implement comprising:
   a frame that is supported by wheels on the ground;
   at least one working unit for working an agricultural field or meadow arranged on the frame;
   a beam having a first end connected to the frame and a second end opposite the frame;
   a drawbar hitch connected to the second end of the beam so as to be pivotable relative to the beam about at least one vertical axis and an axis that is approximately horizontal and extends in a travel and working direction of the implement;
   the drawbar hitch having a receiving end facing away from the frame, wherein the receiving end has a channel-type receptacle adapted to receive and releasably lock a drawbar of an agricultural combined tractor and drive machine in a locked position;
   the receptacle enabling a pivot movement of the drawbar relative to the drawbar hitch in the locked position of the drawbar about an axis that is approximately horizontal and transverse to the travel and working direction;
   guiding and adjusting plates disposed in the receptacle and configured to adjust a receiving width of the receptacle to different dimensions of the drawbar;
   the guiding and adjusting plates are configured such that, from a first position, in which the guiding and adjusting plates limit a lateral play of a drawbar with large cross-sectional dimensions relative to the travel and working direction to a minimum, the guiding and adjusting plates are transferrable and lockable in a second position, in which the guiding and adjusting plates limit a lateral play of a drawbar with small cross-sectional dimensions relative to the travel and working direction to a minimum.

2. The implement according to claim 1, wherein the guiding and adjusting plates are configured such that, from the first position, in which the guiding and adjusting plates limit a lateral play of a drawbar with large cross-sectional dimensions relative to the travel and working direction to a minimum, the guiding and adjusting plates are moveable approximately in parallel orientation to the drawbar to be received into the second position, in which the guiding and adjusting plates limit a lateral play of a drawbar with small cross-sectional dimensions relative to the travel and working direction to a minimum.

3. The implement according to claim 1, wherein the guiding and adjusting plates are configured such that, from the first position, in which the guiding and adjusting plates limit a lateral play of a drawbar with large cross-sectional dimensions relative to the travel and working direction to a minimum, the guiding and adjusting plates are pivotable into the second position, in which the guiding and adjusting plates limit a lateral play of a drawbar with small cross-sectional dimensions relative to the travel and working direction to a minimum.

4. The implement according to claim 3, wherein the guiding and adjusting plates are supported pivotably in the receptacle on bearing bolts that are approximately vertically arranged.

5. The implement according to claim 1, wherein the guiding and adjusting plates are configured to be continuously adjustable in the receptacle.

6. The implement according to claim 1, wherein the guiding and adjusting plates are configured to be adjusted in the receptacle by a stepwise adjustment at uniform step intervals.

7. The implement according to claim 6, wherein the guiding and adjusting plates comprise perforated plates and the drawbar hitch has locking plates, wherein the perforated plates are guided between the locking plates.

8. The implement according to claim 7, wherein the locking plates have locking bores arranged in a hole pattern and the perforated plates have locking bores arranged in a hole pattern matched to the hole pattern of the locking plates, wherein a hitch bolt is insertable into aligned locking bores of the perforated plates and the locking plates and the stepwise adjustment is realized by varying an alignment of the locking bores of the locking plates and the perforate plates relative to each other.

9. The implement according to claim 1, wherein the guiding and adjusting plates are provided on opposed sides of the receptacle and are transferred synchronously from the first position into the second position.

10. The implement according to claim 1, further comprising a bolt that secures the drawbar in the drawbar hitch.

11. The implement according to claim 1, further comprising bushings correlated with the drawbar hitch for adjusting the drawbar hitch to different drawbar sizes, wherein the bushings are configured to change a bore size of the drawbar.

12. A pull-type agricultural implement comprising:
a frame that is supported by wheels on the ground;
at least one working unit for working an agricultural field or meadow arranged on the frame;
a beam having a first end connected to the frame and a second end opposite the frame;
a drawbar hitch connected to the second end of the beam so as to be pivotable about at least one vertical axis relative to the beam;
the drawbar hitch having a receiving end facing away from the frame, wherein the receiving end has a channel-type receptacle adapted to receive and releasably lock a drawbar of an agricultural combined tractor and drive machine in a locked position;
the receptacle enabling a pivot movement of the drawbar about an axis that is approximately horizontal and transverse to the travel and working direction relative to the drawbar hitch in the locked position of the drawbar;
guiding and adjusting plates disposed in the receptacle and configured to adjust a receiving width of the receptacle to different dimensions of the drawbar;
the guiding and adjusting plates are configured such that, from a first position, in which the guiding and adjusting plates limit a lateral play of a drawbar with large cross-sectional dimensions relative to the travel and working direction to an adjusted size, the guiding and adjusting plates are transferrable and lockable in a second position, in which the guiding and adjusting plates limit a lateral play of a drawbar with small cross-sectional dimensions relative to the travel and working direction to an adjusted size.

13. The implement according to claim 12, wherein the guiding and adjusting plates are configured such that, from the first position, in which the guiding and adjusting plates limit a lateral play of a drawbar with large cross-sectional dimensions relative to the travel and working direction to an adjusted size, the guiding and adjusting plates are moveable approximately parallel to the drawbar to be received into the second position, in which the guiding and adjusting plates limit a lateral play of a drawbar with small cross-sectional dimensions relative to the travel and working direction to an adjusted size.

14. The implement according to claim 12, wherein the guiding and adjusting plates are configured such that, from the first position, in which the guiding and adjusting plates limit a lateral play of a drawbar with large cross-sectional dimensions relative to the travel and working direction to an adjusted size, the guiding and adjusting plates are pivotable into the second position, in which the guiding and adjusting plates limit a lateral play of a drawbar with small cross-sectional dimensions relative to the travel and working direction to an adjusted size.

15. The implement according to claim 14, wherein the guiding and adjusting plates are supported pivotably in the receptacle on bearing bolts that are approximately vertically arranged.

16. The implement according to claim 12, wherein the lateral play of the drawbar relative to the travel and working direction limited to an adjustable size is reached when the drawbar within the receptacle is moveable to a limited extent about an axis that is approximately horizontal and transverse to the travel and working direction.

17. The implement according to claim 12, wherein the guiding and adjusting plates are configured to be continuously adjustable in the receptacle.

18. The implement according to claim 12, wherein the guiding and adjusting plates are configured to be adjusted in the receptacle by a stepwise adjustment at uniform step intervals.

19. The implement according to claim 18, wherein the guiding and adjusting plates comprise perforated plates and the drawbar hitch has locking plates, wherein the perforated plates are guided between the locking plates.

20. The implement according to claim 19, wherein the locking plates have locking bores arranged in a hole pattern and the perforated plates have locking bores arranged in a hole pattern matched to the hole pattern of the locking plates, wherein a hitch bolt is insertable into aligned locking bores of the perforated plates and the locking plates and the stepwise adjustment is realized by varying an alignment of the locking bores of the locking plates and the perforate plates relative to each other.

21. The implement according to claim 12, wherein the guiding and adjusting plates are provided on opposed sides of the receptacle and are transferred synchronously from the first position into the second position.

22. The implement according to claim 12, further comprising a bolt that secures the drawbar in the drawbar hitch.

23. The implement according to claim 12, further comprising bushings correlated with the drawbar hitch for adjusting the drawbar hitch to different drawbar sizes, wherein the bushings are configured to change a bore size of the drawbar.

* * * * *